United States Patent [19]

Christensen et al.

[11] 4,006,076

[45] * Feb. 1, 1977

[54] PROCESS FOR THE PRODUCTION OF LOW-SULFUR-CONTENT HYDROCARBON MIXTURES

[75] Inventors: Robert I. Christensen, San Rafael; George D. Gould, Orinda, both of Calif.

[73] Assignee: Chevron Research Company, San Francisco, Calif.

[ * ] Notice: The portion of the term of this patent subsequent to Sept. 2, 1992, has been disclaimed.

[22] Filed: June 2, 1975

[21] Appl. No.: 583,139

Related U.S. Application Data

[63] Continuation-in-part of Ser. No. 355,230, April 27, 1973, Pat. No. 3,902,991.

[52] U.S. Cl. .............................. 208/211; 208/210; 208/216; 208/218; 208/89
[51] Int. Cl.² ................ C10G 23/02; C10G 34/00
[58] Field of Search ................ 208/211, 216, 210

[56] References Cited

UNITED STATES PATENTS

| | | | |
|---|---|---|---|
| 3,814,683 | 6/1974 | Christman et al. | 208/216 |
| 3,814,684 | 6/1974 | Christman et al. | 208/216 |
| 3,900,430 | 8/1975 | Beaty, Jr. | 208/216 |
| 3,902,991 | 9/1975 | Christensen et al. | 208/210 |

Primary Examiner—George Crasanakis
Attorney, Agent, or Firm—G. F. Magdeburger; R. H. Davies; D. L. Hagmann

[57] ABSTRACT

Hydrocarbon mixtures having low sulfur contents are obtained from sulfur-containing vacuum gas oils by hydrodesulfurizing the gas oils under mild hydrodesulfurizing conditions, including use of:

1. a select high-activity hydrodesulfurization catalyst,
2. a temperature 550° the range 550°F. to 850° F., and
3. a hydrogen partial pressure in the range 300 to 800 psig.

New and advantageous results are obtained by integrating the foregoing process with one or more other process steps including:

1. hydrodesulfurization of sulfur-containing vacuum residuum,
2. solvent deasphalting of vacuum residuum, or
3. hydrodesulfurizing a vacuum residuum and delayed coking at least a portion of the product.

26 Claims, 4 Drawing Figures

PROCESS FOR THE PRODUCTION OF LOW-SULFUR-CONTENT HYDROCARBON MIXTURES

CROSS-REFERENCE TO RELATED APPLICATION

This application is a continuation-in-part of U.S. Ser. No. 355,230 filed 4/27/73, now U.S. Pat. No. 3,902,991.

BACKGROUND OF THE INVENTION

The present invention relates to the production of hydrocarbon mixtures of low sulfur content. More particularly, it relates to deep hydrodesulfurization of vacuum gas oils obtained from reduced-crude fractions of sulfur-containing crude oils and the production of hydrocarbon mixtures such as fuel oil, fuel oil blending stock, kerosene, diesel and fluid catalytic cracker feeds having low sulfur contents. In an especial aspect of the invention, fuel oil blends having a low sulfur content are produced in an integrated hydrodesulfurization process from vacuum gas oil (VGO) and vacuum residuum (VR) fractions of sulfur-containing reduced-crude oils. Other advantages obtained from the use of the present unique hydrodesulfurization process will be evident from the descriptions and examples herein.

Petroleum hydrocarbons are being used up at an everincreasing rate. New crude discoveries have not been sufficient to maintain the unproduced reserve. As a result, crude oils heretofore avoided where possible because of undesirable properties, especially those with high sulfur contents and those also containing heavy metal contaminants, must now be used as feeds for petroleum refineries. Asphaltenes frequently are found in combination with the metal contaminants and these together with sulfur and the metals are a source of serious processing and cost problems in the refining of such crude oils.

The dwindling world supply of crude oil makes it imperative that the refiners secure every last drop of useful hydrocarbon from a crude; and the need to do better in protecting the environment, for example by removing sulfur from combustion fuels, has made it evident that new and better processing methods and more select catalysts are needed. Better yields and reduced sulfur contents must be achieved. In particular, improvements in the processing of a vacuum gas oil from a reduced-crude feedstock are needed which in concert achieve:

1. a deeper desulfurization of vacuum gas oils, especially for the 350° F. and higher boiling point hydrocarbon mixtures (atmospheric pressure) to at least to a sulfur content (weight percent) below about 0.2, preferably below 0.1, and most preferably below about 0.05;
2. the use of hydrodesulfurization process temperature which is less than 850° F.;
3. a longer operating cycle for the catalyst in the hydrodesulfurization of a vacuum gas oil, e.g., a cycle of at least thirty months.
4. a select high-activity vacuum gas oil hydrodesulfurization catalyst capable of deeper [item (1) above] sulfur removal and suitable for use with a combined feedstock, i.e., a mixture of vacuum gas oil and of vacuum-residuum gas oil, and the like;
5. a vacuum gas oil hydrodesulfurization process performance permitting integration thereof with concurrent vacuum residuum hydrodesulfurization means for the substantial reduction of fuel oil pool sulfur content levels to new low levels, for example below 1 weight percent, and even to below 0.3 weight percent;
6. a lower hydrogen gas consumption per unit of processed reduced-crude oil; and
7. fuel oil products having acceptable stabilities.

SUMMARY OF THE INVENTION

In a broad embodiment, the present invention is a process for producing from a sulfur-containing reduced-crude feedstock, for example, an Arabian crude having a sulfur content above 1 weight percent, calculated as elemental sulfur, various valuable products, including a low-sulfur 350° F.+ material suitable for use as a fuel oil or fuel oil blend stock, an FCC charge stock, kerosene or diesel fuel. In the process the reduced-crude is separated into at least one vacuum gas oil fraction, which may boil in the range 600°–1100° F., and a vacuum residuum fraction. The vacuum gas oil fraction is contacted with a select high-activity desulfurization catalyst and hydrogen gas in a hydrodesulfurization zone at mild hydrodesulfurization conditions, and from the hydrodesulfurization reaction zone is withdrawn a product having a sulfur content below 0.2 weight percent.

By mild hydrodesulfurization conditions, as used herein, is meant the employment of process conditions, including:

1. a hydrogen partial pressure in the range 300 to 800, preferably 350–650 psig; and
2. a temperature in the range 550 to 850° F.

The vacuum residuum fraction may be subjected to further processing as desired.

More specific embodiments of the present invention include:

1. The use of the 350° F.+ boiling fraction of the sulfur-reduced vacuum gas oil produced as described above as a blend stock for upgrading a sulfur-reduced vacuum residuum fuel oil;
2. The use of all or a portion of a sulfur-reduced vacuum gas oil produced as described above as a feed for a fluid catalytic cracker (FCC) unit, particularly the 650° F.+ boiling fraction;
3. The production of a $C_4$+ boiling range sulfur-reduced vacuum gas oil produced as described above, separating the resulting sulfur-reduced vacuum gas oil by fractional distillation into:
   a. a butane fraction;
   b. a $C_5$–350° F. fraction with a sulfur content less than 0.01, e.g., 0.005, weight percent; and
   c. a 350°–1050° F. fraction with a sulfur content less than 0.1 weight percent, separating the 350°–1050° F. fraction by fractional distillation into a 350°–650° F. fraction with a sulfur content less than 0.05 weight percent, separating the 350°–650° F. product by fractional distillation into a kerosene-plus-diesel boiling range fraction with a sulfur content less than 0.05 weight percent, and into a 650° F.+ boiling feed for an FCC or hydrocracker unit; and
4. Still further embodiments of the present invention will be evident from the Figures below and the description.

By a reduced-crude feedstock or oil, as used herein, is meant the residue or bottoms fraction normally obtained in the topping by distillation of a whole crude, i.e., a topped whole crude. Usually the distillation is an atmospheric distillation, but is may be carried out, if desired, and as known in the art, under a moderately subatmospheric pressure.

The reduced-crude feedstocks contemplated for use herein vary widely depending upon the crude oil which is topped to obtain them. In general, reduced-crude feedstocks obtained from whole crude oils having a 1 weight percent sulfur content or higher are satisfactory and reduced-crude feedstocks obtained from these whole crude oils are contemplated for use herein. The whole crude oil may have smaller relative amounts of sulfur and still yield satisfactory reduced-crude feedstocks. However, as the sulfur impurity in the whole crude oil becomes less, the economic and process advantages of the present process also become less. Preferably, asphaltene and metal contents of the whole crude oil from which the reduced-crude feedstock is obtained are low, but these factors are of secondary importance. Reduced-crude feedstocks obtained from whole crude oils which contain substantial amounts of asphaltenes, and metals as normally present in a whole crude, are satisfactory and contemplated for use herein provided that the amount of sulfur in the whole crude is about 1 weight percent or higher. There is no particular prerequisite as to the form of the sulfur in the reduced crude. That is, the form of the sulfur in the reduced crude may vary widely and is dependent upon the natural condition of the sulfur in the whole crude which is topped to produce the feedstock. Sulfur contents, as expressed throughout the description, are calculated as elemental sulfur.

If the metals content tends to lead to an undesirable catalyst fouling rate, a prior removal in large part may be carried out by ordinary methods (see, for example, U.S. Pat. No. 3,696,027). Also, see the paper "Isomax Process for Residuum and Whole Crude" by S. G. Paradis, G. D. Gould, D. A. Bea and E. M. Reed, Chemical Engineering Process [Volume No. 67, No. 8, Pages 57–62 (1971)].

The vacuum gas oils satisfactory for use in the present invention are those ordinarily obtained by the fractional distillation at a subatmospheric pressure of a reduced-crude oil having the characteristics as described above and these are contemplated for use herein. The pressures employed for these fractionations are below 1 atmosphere, usually in the range 0.06–0.25 atmosphere, and the resulting vacuum gas oils and vacuum residua are useful and contemplated for use as described in the present disclosure. The vacuum gas oils preferred herein have an initial boiling point (ASTM-D1100) between 350° F. and about 850° F. and an end boiling point in the range 900 to 1100° F., preferably above 1000° F. The vacuum residua, on the other hand, employed herein are the bottoms fractions from the aforementioned fractional distillation of reduced-crudes under vacuum. These are contemplated for use herein. Preferred vacuum residua have an initial boiling point of about 1000° F.

The process herein, that is using a select high-activity hydrodesulfurization catalyst and mild hydrodesulfurization conditions, is especially satisfactory for the production in good yield of a low-sulfur-content fuel oil from a sulfur-containing vacuum gas oil. Surprising advantages include:

1. a hydrocarbon product mixture having a sulfur content in the range, broadly, of 0.005 to 0.2 weight percent, particularly 0.1 to 0.005, and most particularly 0.1 to 0.05;

2. a run cycle, hrs., in the range 8,000 to 30,000, usually greater than 24,000; and
3. a hydrogen consumption which is in general less than required in a conventional process.

Other advantages are the production in excellent yield of a fuel oil of good stability, in an operation which is carried out with substantially reduced costs -- operational, catalyst and the like -- relative to those for a conventional hydrodesulfurization process. Still further advantages in which the above-described hydrodesulfurization process is integrated with other process steps will be evident from the description and Figures below.

Select High-Activity Hydrodesulfurization Catalysts

By a select-high activity hydrodesulfurization catalyst, as used herein, is meant by definition a catalyst comprising a composite of oxides and/or sulfides of a Group VIII component, a Group VIA component and a refractory metal oxide catalyst base component comprising alumina, which catalyst contains pores and has a pore volume in the range from 0.3 to 1 cc per gram, in which the pores have a diameter in the range 0 to about 3000 Angstroms and an average pore diameter in the range 80 to 150 Angstroms, the 80 to 150 Angstrom diameter pores contribute at least 70 volume percent of the pore volume. The aforementioned Groups are as set forth in the Periodic Chart of the Atoms (The Welch Scientific Co.). Excellent results have been obtained with catalysts of the foregoing description which:

1. comprise cobalt, molybdenum, and alumina;
2. have an average pore diameter in the range 80–120 Angstroms (see U.S. Pat. No. 3,684,688 for background details with respect to average pore diameter determinations and other references);
3. have an atomic ratio of cobalt to molybdenum in the range 0.3 to 0.6, preferably about 0.4;
4. have a pore volume at least 0.5 cc per gram; and
5. are sulfided, either prior to use or during process operation.

In connection with the select catalyst described above, the balance of the catalyst pore volume is made up of pores having a diameter in the 0 to 80 and 150 to 1000 and higher, possibly insofar as a meaningful contribution to the pore volume as shown by mercury porosimetry, to about 3000, Angstrom range. For convenience in describing this invention and based upon experience, catalyst pores are desirably classified as follows:

| Pore Diameter Range, Angstroms | Description |
| --- | --- |
| >0 to 50 | minimicropores |
| 50 to 500 | micropores |
| 500 to 1000 | minimacropores |
| above 1000 | macropores |

The foregoing limiting values of the ranges, that is 50, 500 and 1000 Angstroms, are, of course, qualitative. However, these ranges in general are significant in the present context. Thus, pores having diameters in the minimicropore range contribute little or nothing to the desired hydrodesulfurization and even appear to be deleterious. For example, when the major portion of the balance of the pore volume of the catalyst (the portion contributed by pores outside the 80 to 150

Angstrom range) is made up of pores in the minimicropore range, the catalyst is substantially less desirable, in terms of the relative catalyst deactivation rate, than where this portion is made up in the main, of minimacropores. Preferably the minimicropore content of the catalyst is less than about 5 volume percent of the pore volume.

In addition to alumina, which must be the major (at least 80, more preferably at least 95 and most preferably essentially 100 weight percent) component of the catalyst base (the catalyst less the Groups VI and VIII components, calculated as metal), the catalyst base may contain a minor portion of one or more of the substantially inert refractory metal oxides of Groups II, III and IV of the Periodic Chart of the Atoms, that is oxides whose addition to the base imparts no significant (less than 5 percent of the cracking activity, if any, of the total catalyst composite) incremental cracking activity to the catalyst.

Particularly good results obtain when the catalyst further contains phosphorus (1 to 10 weight percent calculated as $P_2O_5$).

Good results may be obtained when nickel is used in place of the cobalt.

Select hydrodesulfurization catalysts, as herein, have a high metals-acceptance capability, have especially low fouling rates, and have high hydrodesulfurization activity under the mild desulfurization conditions of the process of the present invention. For reasons of cost, the density of the catalyst composite should be in the range below about 60 pounds per cubic foot, preferably below 50 pounds. The size of the composite should be in the range one-eighth inch to one-fortieth inch, preferably one-eighth to one-sixteenth inch.

An especially suitable select high-activity hydrodesulfurization catalyst, as defined herein, may be prepared by the steps comprising:
1. calcining an alumina (no previous calcination experience above about 1700° F.) support at a temperature in the range 1400° to 1700° F.;
2. impregnating the calcined alumina with an aqueous solution of a cobalt salt and a heteropolyphosphomolybdic acid; and
3. sulfiding the composite prior to use by ordinary means or in situ in use by contacting of a sulfur-containing feed, as herein, with the composite under hydrodesulfurizing conditions.

DETAILED DESCRIPTION OF SPECIFIC EMBODIMENTS

Figure 1:
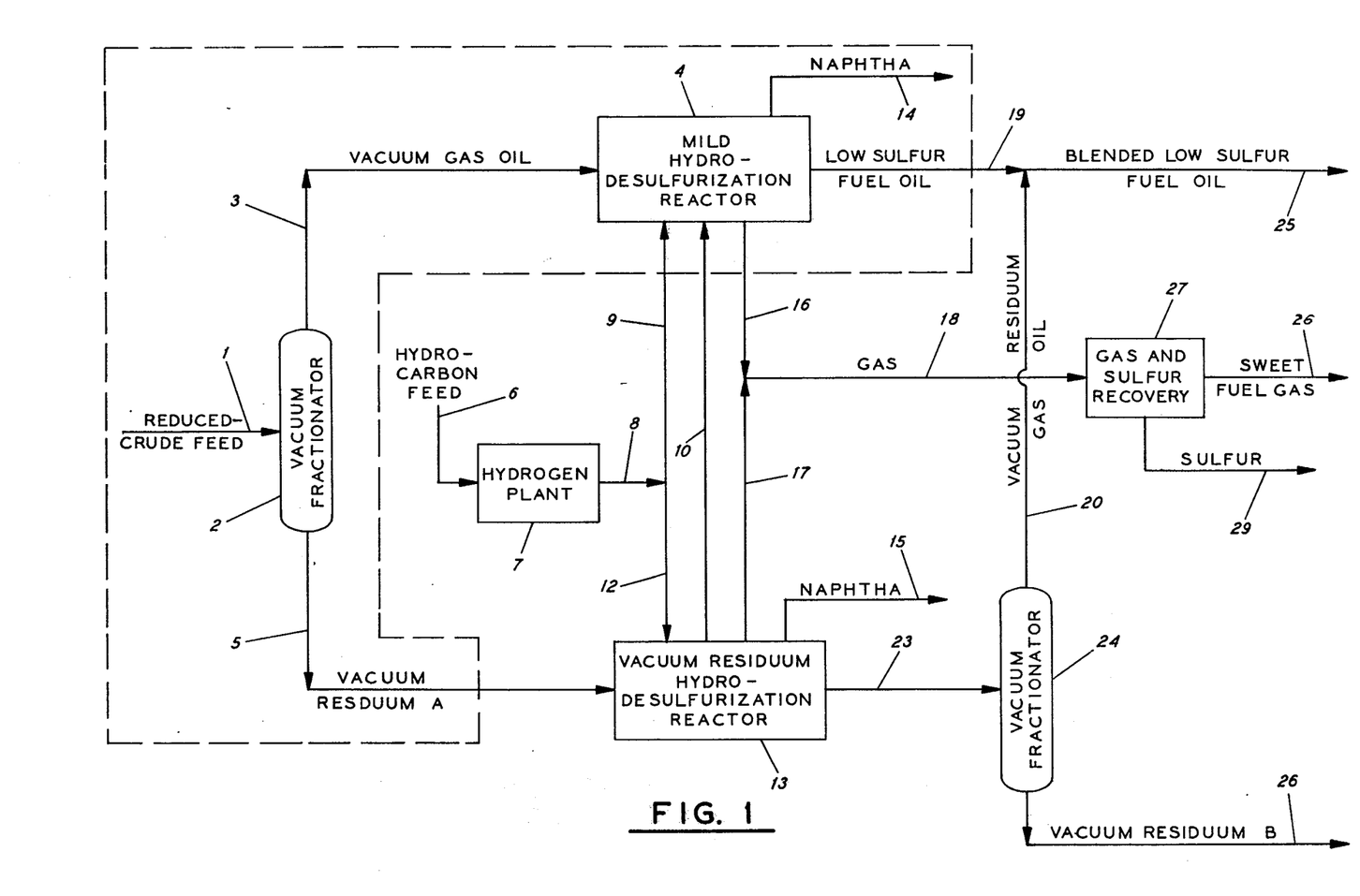
FIGS. 1-4 are process flow diagrams schematically indicating preferred embodiments of the process of the present invention.

Referring now to FIG. 1, a reduced-crude feedstock, a 650° F.+ Kuwait residuum, is fed at a rate of 50,000 barrels per operating day (BPOD) via line 1 to crude oil vacuum fractionation zone 2. In addition to a reduced-crude oil, other sulfur-containing hydrocarbon sources such as shale oils, tar sand oils and oils derived from coal can be fed to fractionation zone 2. Fractionation zone 2 consists basically of a typical vacuum distillation unit, as used in the petroleum refining art. In zone 2 the Kuwait residuum is separated into an overhead fraction, a vacuum gas oil, in an amount of 30,000 BPOD and a bottoms fraction, a vacuum residuum (1050° F.+ true boiling point cut) in an amount of 20,000 BPOD. The vacuum gas oil is withdrawn from fractionator 2 via line 3 and passed to mild hydrodesulfurization reactor 4 and the vacuum residuum is withdrawn from fractionator 2 via line 5 and passed to vacuum residuum hydrodesulfurization reactor 13. In reactor zones 4 and 13 the respective feeds, vacuum gas oil, or vacuum residuum, are mixed with hydrogen and hydrodesulfurized under mild or vacuum residuum hydrodesulfurization conditions, respectively. The hydrogen is obtained from a suitable source. For example hydrogen is produced in hydrogen plant 7 by steam reforming about 1800 BPOD of naphtha, which is introduced to hydrogen plant 7 via line 6. The produced hydrogen is withdrawn from hydrogen plant 7 via line 8 in an amount of about 36 million standard cubic feet per day (MMSCFD). Via lines 8 and 12, hydrogen is delivered to reactor 13 comprised of 25 MMSCF per day plus hydrogen to be bled (cascaded) via line 10 to reactor 4, which requires about 11 MMSCF per day of hydrogen. The balance of the hydrogen required for reactor 4 for an economic balance is delivered to reactor 4 from hydrogen plant 7 via lines 8 and 9.

In reactor 4, the mild hydrodesulfurization zone, the vacuum gas oil is mixed with hydrogen (below 2000 standard cubic feet per barrel of vacuum gas oil) and contacted with a select highactivity desulfurization catalyst which is a sulfided solid composite
1. containing cobalt, molybdenum, phosphorus and alumina;
2. having an average pore diameter of about 100 Angstroms with at least 70% of the pores having a pore diameter in the range 80 to 150 Angstroms;
3. having an atomic ratio of cobalt to molybdenum of about 0.4; and
4. having a pore volume of about 0.5 cc per gram.

The contacting is at a hydrogen partial pressure of about 550–800 psia, a total pressure of about 700–1200 psig, a temperature of about 700°–800° F., and at a liquid hourly space velocity (LHSV) of about 1.5–2.5. The contacting of the vacuum gas oil feed, as directed above, results in the production of naphtha, a low-sulfur fuel oil having a sulfur content of about 0.1 weight percent, and a light hydrocarbon gas-$H_2S$ mixture. The naphtha is removed from reactor 4 via line 14 at a rate of about 660 BPOD and the fuel oil is removed from reactor 4 via line 19 at a rate of about 29,600 BPOD. The light gas-$H_2S$ mixture is withdrawn from reactor 4 via line 16 and is passed to a conventional gas and sulfur recovery unit, 27, for processing.

In reactor 13, the vacuum residuum introduced via line 5 and the hydrogen (about 5000 SCF per barrel of vacuum residuum) introduced via line 12 are mixed and contacted with a satisfactory vacuum residuum hydrodesulfurization (VRDS) catalyst, for example a sulfided select high-activity hydrodesulfurization catalyst as used in the VGO stage described above, except for the material difference in that for VRDS purposes the catalyst must not contain an appreciable amount of macropores (i.e., less than 3 pore volume percent) for reasons to be discussed below, and having the following nominal composition and characteristics as indicated:

| | |
|---|---|
| Cobalt (as metal), wt. % | 3 |
| Molybdenum (as metal), wt. % | 11 |
| Phosphorus (as $P_2O_5$), wt. % | 1 |
| $Al_2O_3$ | Remainder |
| Pore volume, cc/g | 0.6 |
| Avg. Pore Diameter, Angstroms | 130–150 |
| Pore Distribution, % of Pore Volume | |

| -continued | |
|---|---|
| 0–80 Angstroms | 9 |
| 80–150 Angstroms | 87 |
| 150–1000 Angstroms | 3 |
| >1000 Angstroms | 0.2 |

The VRDS stage is carried out under suitable vacuum residuum hydrodesulfurization conditions, for example a temperature of about 700°–800° F., a total pressure of about 2000 psig, a hydrogen partial pressure of about 1600 psia, an LHSV of less than 0.5. The treatment of the vacuum residuum in reactor 13 results in the production of naphtha and a sulfur-reduced vacuum residuum as the principal products and a light gas fraction comprising low-molecular-weight hydrocarbons and hydrogen sulfide. The naphtha is removed from reactor 13 via line 15 at a rate of about 600 BPOD. The light gas stream containing hydrocarbons and hydrogen sulfide is withdrawn from reactor 13 via line 17 and passed to a conventional gas and sulfur recovery unit 27 via lines 17 and 18.

The sulfur-reduced vacuum residuum produced in reactor 13 is withdrawn via line 23 and is passed to a vacuum fractionator 24 for separation into a bottoms product and an overhead fraction. The bottoms product is withdrawn from fractionator 24 via line 26 at a rate of 14,900 BPOD and comprises a 1050° F.+ boiling residuum which contains about 0.95% sulfur.

From vacuum fractionator 24 the overhead fraction comprising 350°–1,050° F. boiling range hydrocarbons having a sulfur content of about 0.35% is withdrawn via line 20 at a rate of 5200 BPOD. A low-sulfur fuel oil pool is produced by the integrated process, as represented in FIG. 1, in an amount of about 34,800 BPOD and having a sulfur content of about 0.14%. This fuel oil pool or blend has a good stability and is an excellent synthetic replacement for the virgin low-sulfur-content fuel oils presently available in the market.

Alternatively, at least a portion of the low-sulfur product from the mild hydrodesulfurization zone 4 may be used as a charge stock for a fluid catalytic cracker or a hydrocracker.

Figure 2:
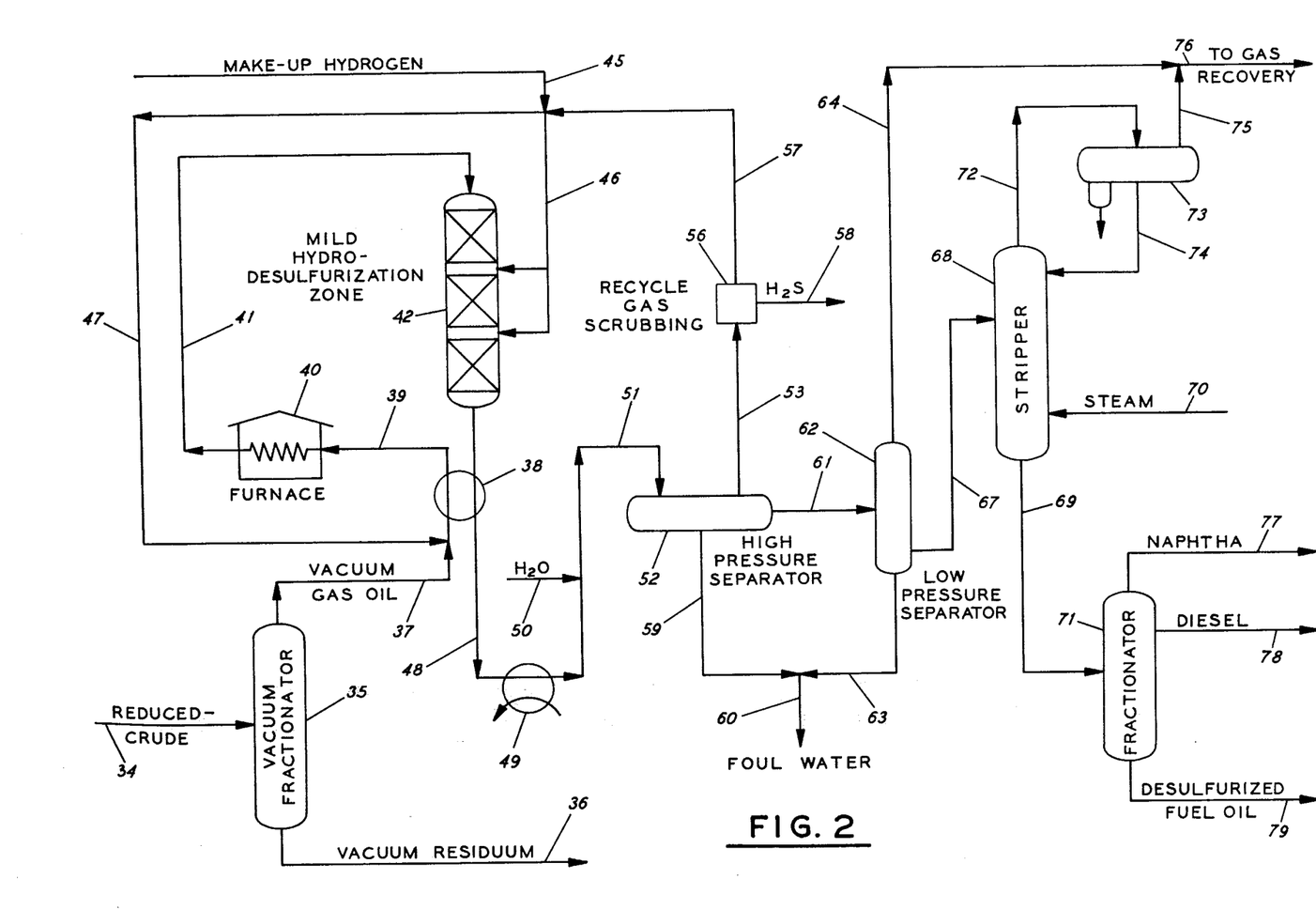

Referring now to FIG. 2, a reduced-crude is processed substantially in the manner as described for that portion of the process of FIG. 1 which is enclosed within the dotted lines except:
1. more detail is given with respect to some of the auxiliary elements, and
2. the heavier fraction of the desulfurized vacuum gas oil is fractionated after withdrawal from low pressure separator 62 via line 67. The withdrawn gas oil is passed to stripper 68 via line 67 for removal of the light fraction. The stripped gas oil is withdrawn from stripper 68 and passed via line 69 to fractionator where it is separated into a naphtha overhead fraction, a diesel oil side cut and a desulfurized fuel oil bottoms, which are withdrawn via lines 77, 78 and 79, respectively.

Figure 3:
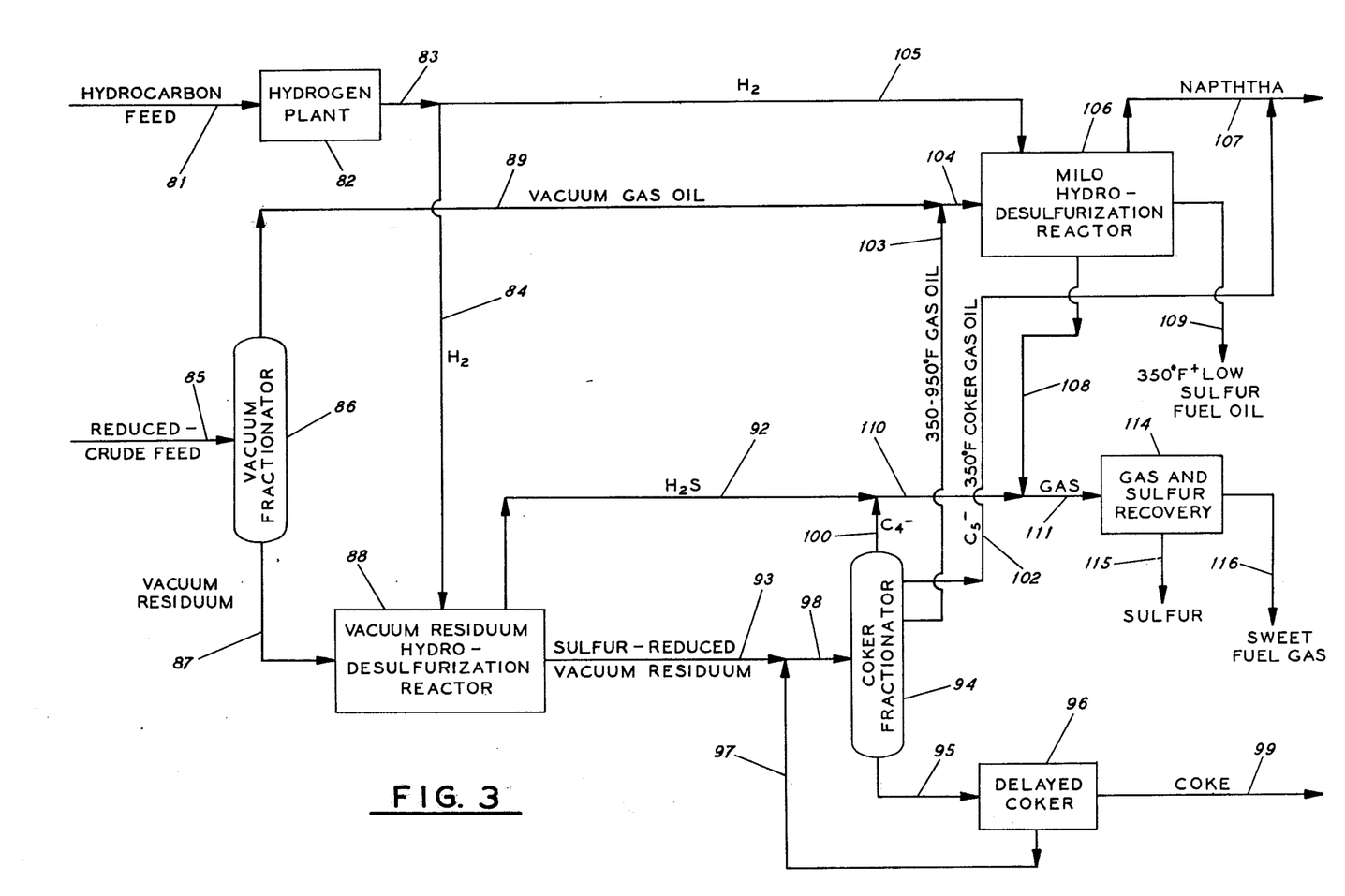

Referring now to FIG. 3, a reduced-crude feed, a 650° F.+ boiling Iranian light residuum is delivered via line 85 at a rate of 45,000 barrels per operating day (BPOD) to vacuum fractionator 86 for separation into a vacuum gas oil and a 1050° F.+ boiling vacuum residuum. Via line 89 vacuum gas oil having a sulfur content of about 1.6 weight percent is withdrawn from vacuum fractionator 86 at a rate of about 30,000 BPOD. Via line 87 the vacuum residuum is withdrawn from fractionator 86 at a rate of about 15,000 BPOD and is passed to vacuum residuum hydrodesulfurization reactor 88. In reactor 88 the vacuum residuum is mixed with hydrogen, which is introduced to reactor 88 via line 84, and desulfurized by contact with a catalyst as described above for use in reactor 13 under the following conditions:

| | |
|---|---|
| Average Bed Temperature, ° F. | 700–800 |
| Pressure, psig | 1750 |
| Space Velocity, V/V/hr. | <0.5 |
| Hydrogen Rate, SCFB | 5000 |
| Hydrogen Purity, Volume Percent | 90 |

Hydrogen sulfide and light hydrocarbon gases produced by the desulfurization in reactor 88 are withdrawn from the reactor via line 92 and delivered via lines 92, 110 and 111 to gas and sulfur recovery unit 114 for processing. Via line 93 sulfur-reduced vacuum residuum having a sulfur content of about 0.7% is withdrawn from reactor 88 and is delivered via lines 93 and 98 to coker fractionator 94 for separation into a C₅-350° F. naphtha, a 350°–950° F. coker gas oil and a bottoms fraction, a coker feed. The coker feed is withdrawn from fractionator 94 via line 95 and passed to delayed coker 96. Delayed coker 96 is a conventional coke-forming unit which converts the feed to a metallurgical grade coke product and a vaporized hydrocarbon, a coker effluent. The coker effluent withdrawn from the unit 96 via line 97 and passed to the coker fractionator via lines 97 and 98. Coke having a sulfur content below 2 weight percent and a metals content below 100 ppm of vanadium is withdrawn from coker 96 via line 99 at a rate of about 370 short tons per day.

Three overhead hydrocarbon fractions are withdrawn from coker fractionator 94, the first a C₄– fraction, the second the C₅+-350° F. naphtha, and a third, a 350°–950° F. coker gas oil. Via line 100 the C₄- light hydrocarbon fraction is withdrawn from fractionator 94 and passed via lines 100, 110 and 111 to gas and sulfur recovery unit 114. The C₅-350° F. naphtha is combined via line 102 with the naphtha produced in the mild hydrodesulfurization reactor 106. Via line 103 the 350°–950° F. coker gas oil is withdrawn from fractionator 94 at a rate of about 11,600 BPOD. This gas oil, having a sulfur content of about 0.35% sulfur, is mixed with the vacuum gas oil by joining lines 103 and 89, is line mixed and passed via line 104 to mild hydrodesulfurization reactor 106. In reactor 106 the combined vacuum gas oil and coker gas oil feed is mixed with hydrogen and contacted with a select high-activity desulfurization catalyst in the manner described for the process of FIG. 1 with the production of naphtha and low-sulfur-content fuel oil. The naphtha is separated by fractionation and withdrawn from reactor 106 via line 107 at a rate of 375 BPOD. This is combined with the naphtha from the coker fractionator for a total naphtha of 2400 BPOD. Fuel oil having a sulfur content of 0.1 weight percent is withdrawn from reactor 106 via line 109 at a rate of 41,100 BPOD.

The hydrogen sulfide and light hydrocarbon-containing gas steams withdrawn from reactors 88 and 106 and from coker fractionator 94 are passed to gas and sulfur recovery unit 114 via the lines indicated in FIG. 1, and in unit 114 using ordinary recovery methods the hydrogen sulfide is converted to sulfur and the light hydrocarbons are separated into a sweet fuel gas product.

The former is withdrawn from unit 114 via line 115 at a rate of about 160 short tons per day and the sweet fuel gas is withdrawn from unit 114 via line 116 at a rate of 375 BPOD.

Delayed cokers or furnace type coking units heat the residuum or other hydrocarbon feedstock to coking temperatures rapidly and little reaction occurs while the charge is in the furnace. Effluent from the furnace discharges at about 850° F. to 1000° F. (see, for example, U.S. Pat. No. 2,727,853). U.S. Pat. No. 2,988,501 and U.S. Pat. No. 3,027,317 disclose coking ahead of hydrodesulfurization and U.S. Pat. No. 3,684,688 disclose coking afterwards.

The integrated process of FIG. 3 has many process advantages, including:
1. A practical process by which can be produced at least about a 91 liquid volume percent yield of low sulfur fuel oil product from a high-sulfur-content reduced-crude oil and about 5% $C_5$-350° F. naphtha; and
2. A practical means for disposing of high-sulfur-content by-product, e.g., producing metallurgical grade coke and additional fuel oil range gas oil.

Figure 4:
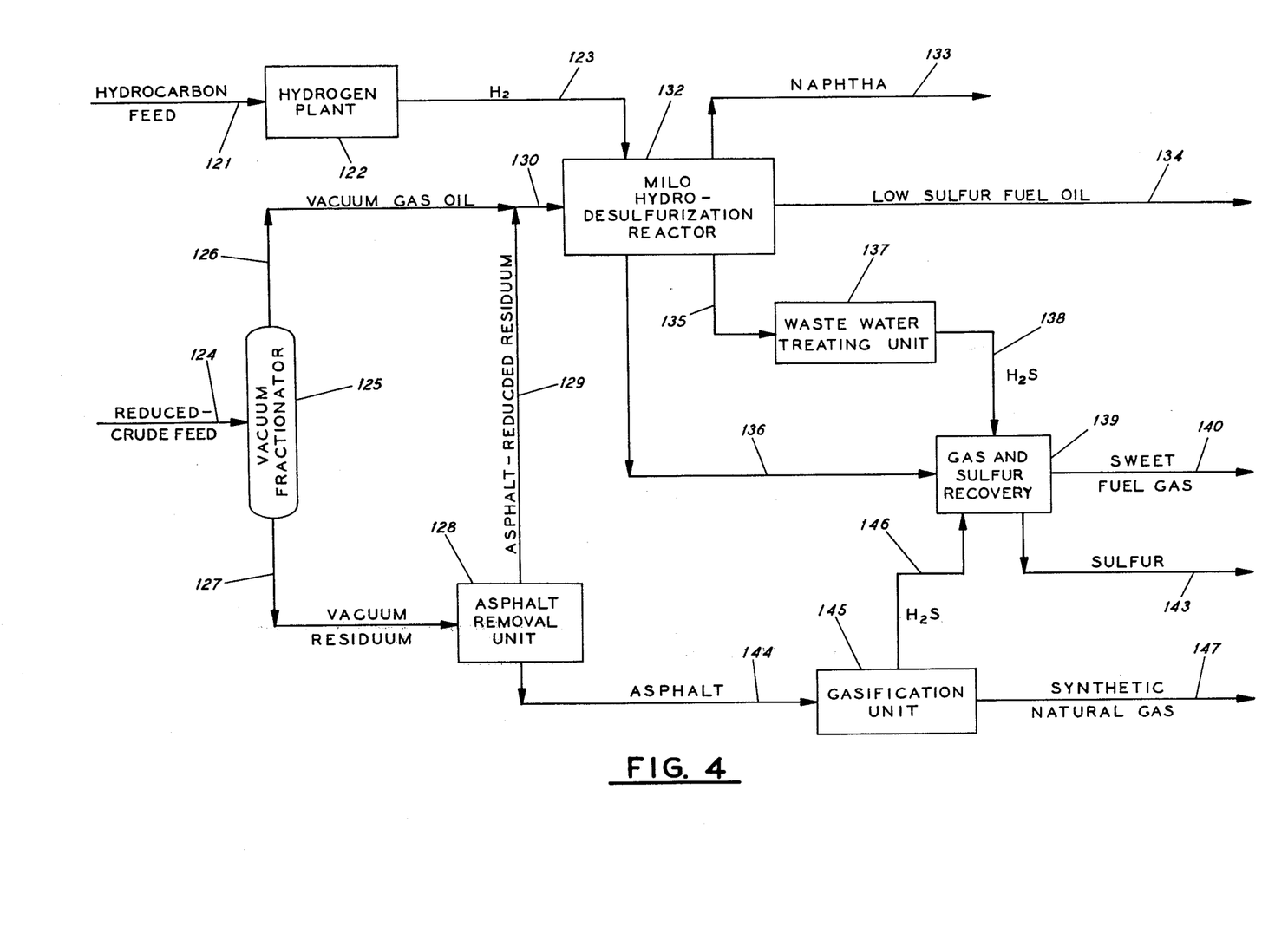

Referring now to FIG. 4, a reduced-crude feed, a 650° F.+ boiling Arabian light residuum is delivered via line 124 at a rate of 50,000 barrels per operating day (BPOD) to vacuum fractionator 125 for separation into a vacuum gas oil and a 1050° F.+ boiling vacuum residuum. Via line 26 vacuum gas oil having a sulfur content of about 2.8 weight percent is withdrawn from vacuum fractionator 125 at a rate from about 34,500 BPOD. Via line 127 vacuum residuum having a sulfur content of 4.1 weight percent is withdrawn from fractionator 125 at a rate of about 15,500 BPOD and is passed to asphalt removal unit 128 for separation of the vacuum residuum into asphalt or tar and an asphalt-reduced residuum, a solvent-deasphalted oil. The separation in asphalt removal unit 128 is carried out using conventional solvent deasphalting methods, for example, butane-pentane solvent deasphalting or the like.

Asphalt or tar having a sulfur content of about 6.1% is withdrawn from unit 128 via line 144 and passed to gasification unit 145 for gasification and separation into a sulfur-containing fraction comprising hydrogen sulfide and into a synthetic natural gas fraction substantially free of sulfur. The gasification is effected by conventional process methods, for example, by the Texaco Partial Oxidation Process or the Shell Gasification Process.

Asphalt-reduced residuum (solvent-deasphalted oil) having a sulfur content of about 3.4 weight percent is withdrawn from unit 128 at a rate of about 12,400 BPOD and combined with vacuum gas oil by joining lines 129 and 126 and the combined feeds are line mixed and passed via line 130 to mild hydrodesulfurization reactor 132. The combined vacuum gas oil and asphalt-reduced residuum feed is mixed with hydrogen in reactor 132 and desulfurized under mild hydrodesulfurization conditions in the manner described for the corresponding portion of the process of FIG. 1 to produce naphtha, low-sulfur fuel oil and by-product streams containing hydrogen sulfide. Naphtha is separated by fractionation and withdrawn via line 133 from reactor 132 at a rate of about 200 BPOD. Via line 134 low-sulfur fuel oil having a sulfur content of about 0.05 weight percent is withdrawn at a rate of 46,700 BPOD.

In gas and sulfur recovery unit 139 hydrogen sulfide and hydrogen sulfide plus light hydrocarbon effluent streams from reactor 132 and gasification unit 145 are separated into a sweet fuel gas fraction and a sulfur fraction. Via line 140 sweet fuel gas is withdrawn from unit 139 at a rate of about 230 BPOD. Via line 143 sulfur is withdrawn from unit 139 at a rate of about 240 short tons per day. When the gasification unit comprises a partial oxidation gasification coupled with a methanation stage, a synthetic natural gas product can be removed having a heating value of about 930 Btu/SCF.

If the asphalt-reduced vacuum residuum is not mixed with the vacuum gas oil and the hydrodesulfurized vacuum gas oil is back-blended with the asphalt-reduced vacuum residuum, the resulting fuel oil blend has a sulfur content of 0.5 weight percent. Such a high value can be acceptable and useful for some areas and for some purposes. The product from the integrated process, the 0.05 weight percent fuel oil, is of course an excellent and highly desirable product having particular reference to desirable environmental protection requirements.

The integrated process of FIG. 4 has many process advantages, including:
1. A practical process by which can be produced at least about a 93 liquid volume percent yield of low sulfur fuel oil product from a high-sulfur, high-asphaltene crude, for example, an Arabian Light atmospheric reduced-crude oil; and
2. A practical means for:
   a. disposing of high-sulfur-content asphalt (tar), and
   b. producing needed synthetic natural gas using ordinary gasification and sulfur recovery means.

Vacuum Residuum Hydrodesulfurization (VRDS) Catalysts

A satisfactory VRDS select hydrodesulfurization catalyst must have a macropore content which is less than about 3 volume percent of the catalyst pore volume. Otherwise, the characterizing parameters for the VRDS catalyst herein correspond to those for a satisfactory VGO select hydrodesulfurization catalyst. A VRDS catalyst is suitable for VGO service, and a VRDS catalyst may be employed in both stages of a combination VGO-VRDS process. For reasons of cost, the VRDS catalyst being more costly to prepare, the VGO catalyst employed in the VGO hydrodesulfurization stage may have a substantial (i.e., above 3 and less than about 10 pore volume percent) macropore content. The deactivation rate of VRDS select catalysts has been found to be directly proportional to the macropore content of the catalyst in VRDS hydrodesulfurization service. In direct contrast the presence of macropores in a VGO catalyst exhibits little or no correspondence with the catalyst deactivation rate.

The VGO and VRDS select hydrosulfurization catalysts satisfactory for use herein may be prepared by any suitable means. Preferably an alumina catalyst base having the necessary catalyst parameters as discussed above is impregnated in a single step using an aqueous impregnatory solution containing cobalt or nickel salt and phosphomolybdic acid (see description of preparation in commonly assigned patent application Ser. No. 333,098 filed Feb. 16, 1973). An alumina catalyst base prepared by ordinary methods usually has a macropore content above about 3 volume percent of the pore volume. In copending application of the commonly assigned application Ser. No. 496,788, filed Aug. 12, 1974, is described a method for the preparation of a catalyst having a macropore content suitable for VRDS service. Usually the macropore content of this catalyst is in the range from about 0.2 to about 3 percent of the pore volume content. Preferably the VRDS select hydrodesulfurization catalyst employed herein has a macropore content which is in the range from about 0.2 to 1.5 pore volume percent of the pore volume.

In addition to the alumina content, a satisfactory VRDS or VGO select hydrodesulfurization catalyst high-sulfur-content crude oils; others are California crude, Alaskan North Slope crude, and the like, as well as blends of crude oils, that is crude oils and crude oil blends in general, which have a sulfur content of at least about 1 weight percent.

EXAMPLE

In the manner described for the process of FIG. 1, encircled portion, a 615°–1050° F. TBP vacuum gas oil from an Arabian medium or a Kuwait-type crude containing 2.8 weight percent sulfur was hydrodesulfurized. The yields and product properties were:

|  | Raw Feed Iranian VGO | Butanes | $C_5$–350° F | 350° F Plus | By-Product K/D Option[1] 350–650° F | 650° F Plus |
|---|---|---|---|---|---|---|
| Yield, LV% |  | 0.1 | 3.8 | 99.3 | 17.5 | 81.8 |
| Inspections |  |  |  |  |  |  |
| Gravity, °API | 22.6 |  | 48 | 28 | 36 | 31 |
| Aniline Point, ° F | 173 |  |  |  |  |  |
| ASTM Distillation, ° F | D1160 |  |  | D1160 | D86 | D1160 |
| ST/5 | 605/ — |  |  | 350/ — | 385/ — | 615/ — |
| 10/30 | 685/745 |  |  | 590/690 | 450/510 | 670/745 |
| 50 | 815 |  |  | 760 | 560 | 805 |
| 70/90 | 905/1005 |  |  | 845/960 | 580/625 | 880/980 |
| 95/EP | — /1100 |  |  | 1000/1065 | — /670 | 1020/1065 |
| Sulfur, Wt. % | 2.8 |  | <0.005 | 0.02 | <0.005 | 0.05 |
| Nitrogen, ppm | 600 |  |  | 110 |  |  |
| Pour Point, ° F | 105 |  |  | 90 | 0 | 95 |
| Viscosity, CS at 122° F | 40 |  |  | 25 | 3.0 | 40 |

[1]Where kerosene and diesel fuel are desired as an option and is separated from the 350° F plus product, the yields of fuel oil, etc. are as listed under the by-product option.

may contain one or more refractory oxide components selected from the same class and under the same conditions as prescribed above for a satisfactory VGO catalyst except of course, with the proviso that the macropore content of the catalyst be as discussed immediately above. For reasons of operating convenience, a catalyst sizing in the range from about one-eighth inch to about one-fortieth inch is preferable, and more preferably in the range one-sixteenth to one thirty-second inch.

Vacuum Residuum Hydrodesulfurization Conditions

Conditions suitable for use for the hydrodesulfurization of a vacuum residua, as herein, vary widely and depend in the main upon the particular feed. In general, satisfactory conditions include the indicated and primary process parameters within the ranges as noted below:

Temperature, ° F. 600–850, preferably 600–800
Pressure, psig 1000–2500, preferably 1500–2200
LHSV <1, preferably <0.5 and the use of a hydrogen-containing gas, preferably a gas having a hydrogen content of at least 75 volume percent.

Representative reduced-crude feeds suitable for use herein include those obtained from Middle Eastern crudes, such as Arabian Light, Kuwait, Arabian Medium, Iranian Heavy (especially for solventing deasphalt route) and Iranian Light crude oils, and the like The low-sulfur oils produced by the process herein, particularly by the hydrodesulfurization of a vacuum gas oil under mild hydrodesulfurization conditions using a select highactivity desulfurization catalyst, are advantageous feedstocks for hydrocracking for the production of more valuable lower-molecular-weight products. Typical operating conditions for catalytic hydrocracking include a temperature between 500 and 900° F., a pressure between 100 and 10,000 psig, a hydrogen rate between 100 and 10,000 SCF per barrel of feed, and the use of a catalyst typically comprising a Group VIB and/or Group VIII hydrogenation component and a cracking component, for example amorphous silica-alumina on a crystalline zeolitic molecular sieve.

Hydrogen Consumption

The amount of hydrogen required to produce a low-sulfur-content fuel oil under the mild hydrosulfurization conditions as herein varies depending upon the sulfur content of the vacuum gas oil to be treated. On the basis of sulfur content of the vacuum gas oil, at least about 40 SCF of hydrogen is required per pound of sulfur to be removed in order to reduce the sulfur content to at least 0.2 weight percent. In Table I below are given comparative examples illustrating sulfur removal hydrogen consumption and resulting product parameters for the desulfurization of vacuum gas oil from an Arabian light crude oil.

TABLE I

| DESULFURIZATION OF ARABIAN LIGHT VACUUM GAS OIL | | | | | |
|---|---|---|---|---|---|
|  | VGO FEED | PRODUCTS | | | |
| $H_2$ Consumption, SCF/Bbl |  | 183 | 240 | 277 | 400 |
| $H_2$ Consumption, SCF/Lb Sulfur Removed |  | 38.6 | 39.6 | 42.5 | 56.5 |
| Inspections |  |  | (350° F + Product Inspections) | | |
| Sulfur, Wt. % | 2.3 | 0.79 | 0.43 | 0.16 | 0.05 |
| Nitrogen, ppm | 650 | 535 | 500 | 420 | 180 |
| °API | 24.6 | 27.0 | 27.7 | 28.5 | 29.3 |
| Nickel, ppm | 0.11 | 0.03 | 0.02 | Nil | Nil |

TABLE I-continued

DESULFURIZATION OF ARABIAN LIGHT VACUUM GAS OIL

| | VGO FEED | PRODUCTS | | | |
|---|---|---|---|---|---|
| Vanadium, ppm | 0.39 | Nil | Nil | Nil | Nil |
| Distillation, ASTM D-1160, °F | | | | | |
| IBP/5 | 508/599 | 462/579 | 511/583 | 464/573 | 424/549 |
| 10/30 | 635/724 | 611/707 | 623/712 | 614/707 | 596/700 |
| 50 | 803 | 780 | 782 | 776 | 763 |
| 70/90 | 846/982 | 860/970 | 868/963 | 851/952 | 848/953 |
| 95/EP | 1009/1044 | 1012/1037 | 994/1044 | 997/1040 | 998/1041 |
| Product Yields | | | | | |
| $C_1$-$C_4$, Wt. % | | 0.04 | 0.12 | 0.30 | 0.35 |
| $C_5$-350° F, LV% | | 0.6 | 0.7 | 0.7 | 0.8 |
| 350° F +, LV% | | 99.3 | 99.3 | 99.4 | 100.1 |

Although various specific embodiments of the invention have been described and shown, it is to be understood that they are meant to be illustrative only and not limiting. Certain features may be changed without departing from the spirit or essence of the invention. It is apparent that the present invention has broad application to the hydrometallization and hydrodesulfurization of hydrocarbons. Accordingly, the invention is not to be construed as limited to the specific embodiments illustrated, but only as defined in the following claims.

What is claimed is:

1. A process for producing a low-sulfur hydrocarbon mixture by desulfurizing a hydrocarbon feedstock, said feedstock being a reduced-crude obtained from a whole crude oil having a sulfur content of at least about 1 weight percent, which comprises:
   1. separating said feedstock into a vacuum gas oil fraction and a vacuum residuum fraction;
   2. contacting at least a portion of said vacuum gas oil with a first hydrodesulfurization catalyst and hydrogen gas in a first hydrodesulfurization zone under a hydrogen partial pressure in the range 300 to 800 psig and a temperature in the range 550 to 850° F., said catalyst comprising a sulfided composite of a Group VIII metal, a Group VIA metal, phosphorus and a catalyst base comprising alumina, said catalyst having a pore volume in the range from 0.3 to 1 cc per gram, the pores of said catalyst having a diameter in the range 0 to about 3000 Angstroms and an average pore diameter in the range 80 to 150 Angstroms, the pores of 80 to 150 Angstrom diameter contributing at least 70 volume percent of said pore volume;
   3. withdrawing from said first hydrodesulfurization zone said low-sulfur hydrocarbon mixture, the 350° F.+ portion thereof having a sulfur content below 0.2 weight percent, calculated as elemental sulfur.

2. A process as in claim 1 wherein said 350° F.+ portion has a sulfur content in the range 0.005 to 0.2

3. A process as in claim 1 wherein said average pore diameter is in the range 80 to 120 Angstroms and said catalyst base is at least 80 weight percent alumina.

4. A process as in claim 1 wherein said Group VIII metal is cobalt or nickel, said Group VIA metal is molybdenum, said pore volume range is 0.5 to 1 cc/g and said catalyst contains phosphorus, calculated as $P_2O_5$, in an amount in the weight percent range from about 1 to 10.

5. A process as in claim 4 wherein less than about 5 volume percent of said pore volume is contributed by minimicropores.

6. A process as in claim 1 wherein said base includes a minor amount of at least one additional substantially inert refractory metal oxide selected from the oxides of metals of Groups II, III and IV.

7. A process as in claim 1 wherein said catalyst base consists essentially of alumina, said Group VIII metal is cobalt or nickel and said Group VIA metal is molybdenum.

8. A process as in claim 1 wherein:
   1. at least a portion of said vacuum residuum fraction is contacted with a second hydrosulfurization catalyst and hydrogen in a second hydrodesulfurizing zone under vacuum residuum hydrodesulfurizing conditions, said catalyst comprising a sulfided composite of a Group VIII metal, a Group VIA metal and a catalyst base comprising alumina, said catalyst having a pore volume in the range of 0.3 to 1 cc per gram, the pores of said catalyst having a diameter in the range 0 to about 3000 Angstroms and an average pore diameter in the range 80 to 150 Angstroms, the pores of 80 to 150 Angstrom diameter contributing at least 70 percent of said pore volume and with the further requirement that of said pore volume, the macropore content thereof is in the range from about 0.2 to 3 volume percent, said vacuum residuum hydrodesulfurization conditions comprising a temperature in the range 600° to 850° F., a pressure in the range 1000 to 2500 psig, a liquid hourly space velocity in the range below about 1 and the use of a hydrogen-containing gas having a hydrogen content of at least about 75 volume percent;
   2. a sulfur-reduced vacuum residuum is withdrawn from said second zone and passed to a vacuum fractionator;
   3. a 350° F.–1050° F. boiling range hydrocarbon mixture having a sulfur content below about 0.15 weight percent is withdrawn from said fractionator; and
   4. a fuel oil blend is produced by mixing at least a portion of said 350° F.–1050° F. hydrocarbon mixture with at least a portion of said 350° F.+ portion, said blend having a sulfur content below about 0.2 weight percent.

9. A process as in claim 8 wherein said macropore content range is from about 0.2 to 1.5 volume percent and said pore volume contains less than about 5 pore volume percent of minimicropores, and said first hydrodesulfurization zone hydrogen partial pressure is in the range 350 to 650 psig.

10. A process for producing a low-sulfur hydrocarbon mixture by desulfurizing a hydrocarbon feedstock, said feedstock being a reduced-crude obtained from a whole crude having a sulfur content of at least about 1 weight percent, which comprises:

1. separating said feedstock into a vacuum gas oil and a vacuum residuum fraction;
2. producing a sulfur-reduced vacuum residuum by contacting at least a portion of said vacuum residuum with a first hydrodesulfurization catalyst and hydrogen in a first hydrodesulfurization zone under vacuum residuum hydrodesulfurizing conditions comprising a temperature in the range 600° to 850° F., a pressure in the range 1000 to 2500 psig, a liquid hourly space velocity in the range below about 1 and the use of a hydrogen-containing gas having a hydrogen content of at least about 75 volume percent, said catalyst comprising a sulfided composite of a Group VIII metal, a Group VIA metal and a catalyst base comprising alumina, said catalyst having a pore volume in the range from 0.3 to 1 cc per gram, the pores of said catalyst having a diameter in the range 0 to about 3000 Angstroms and an average pore diameter in the range 80 to 150 Angstroms, the 80 to 150 Angstrom diameter pores of said catalyst contributing at least 70 volume percent of said pore and wherein an amount in the range from about 0.2 to 3 percent of said pore volume is contributed by macropores.
3. a 350° F.–1050° F. boiling range hydrocarbon fraction is separated from said sulfur-reduced vacuum residuum from step (2) and combined with at least a portion of said vacuum gas oil, thereby producing a VGO-VRDS composite;
4. producing said low-sulfur content hydrocarbon mixture by contacting said VGO-VRDS composite with a second hydrodesulfurization catalyst and hydrogen gas in a second hydrodesulfurization zone under a hydrogen partial pressure in the range 300 to 800 psig and a temperature in the range 550 to 850° F., said catalyst comprising a sulfided composite of a Group VIII metal, a Group VIA metal and a catalyst base comprising alumina, said catalyst having a pore volume in the range from 0.3 to 1 cc per gram, the pores of said catalyst having a diameter in the range 0 to about 3000 Angstroms and an average pore diameter in the range 80 to 150 Angstroms, the pores of 80 to 150 Angstrom diameter contributing at least 70 percent of said pore volume.

11. A process for producing a low-sulfur hydrocarbon mixture by desulfurizing a hydrocarbon feedstock, said feedstock being a reduced-crude obtained from a whole crude oil having a sulfur content of at least about 1 weight percent, which comprises:
1. separating said feedstock into a vacuum gas oil fraction and a vacuum residuum fraction;
2. a sulfur-reduced residuum is produced by contacting at least a portion of said vacuum residuum with a first hydrodesulfurization catalyst under vacuum residuum hydrodesulfurization conditions in a first hydrodesulfurization zone, said catalyst comprising a sulfide composite of a Group VIII metal, a Group VIA metal and a catalyst comprising alumina, said catalyst having a pore volume in the range from 0.3 to 1 cc per gram, said pores having a diameter in the range of 0 to about 3000 Angstroms and an average pore diameter in the range 80 to 150 Angstroms, the 80 to 150 Angstrom diameter pores contributing at least 70 volume percent of said pore volume and wherein an amount in the range from about 0.2 to 3 volume percent of said pore volume is contributed by macropores;
3. passing at least a portion of said sulfur-reduced residuum from step (2) to a coker fractionator;
4. a bottoms fraction is withdrawn from said coker fractionator and passed to a coker;
5. a metallurgical-grade coke is withdrawn from said coker;
6. an overhead fraction is withdrawn from said coker fractionator;
7. producing a composite mixture by combining at least a portion of said vacuum gas oil fraction with at least a portion of said coker fractionator overhead fraction from step (6); and
8. producing said low-sulfur hydrocarbon mixture by contacting said composite mixture from step (7) with a second hydrodesulfurization catalyst and hydrogen gas in a second hydrodesulfurization zone under a hydrogen partial pressure in the range 300 to 800 psig and a temperature in the range 550 to 850° F., said catalyst comprising a sulfided composite of a Group VIII metal, a Group VIA metal and a catalyst base comprising alumina, said catalyst having a pore volume in the range from 0.3 to 1 cc per gram, said pores having a diameter in the range 0 to about 3000 Angstroms and an average pore diameter in the range 80 to 150 Angstroms, said 80 to 150 Angstrom diameter pores contributing at least 70 volume percent of said pore volume;
9. withdrawing from said second hydrodesulfurization zone said low-sulfur hydrocarbon mixture, the 350° F.+ portion thereof having a sulfur content below 0.2 weight percent, calculated as elemental sulfur.

12. A process as in claim 11 wherein said catalyst in said first hydrodesulfurization zone consists essentially of cobalt or nickel, molybdenum, phosphorus and alumina, said macropores of said catalyst are in the range 0.2 to 1.5 percent of said pore volume; and said catalyst in said second hydrodesulfurization zone consists essentially of cobalt or nickel, molybdenum, phosphorus and alumina.

13. A process as in claim 12 wherein Group VIII metal in said first and in said second catalyst is cobalt and said phosphorus and molybdenum are incorporated into said respective catalysts in the phosphomolybdate form.

14. A process for producing a low-sulfur hydrocarbon mixture by desulfurizing a hydrocarbon feedstock, said feedstock being a reduced-crude obtained from a whole crude oil having a sulfur content of at least about 1 weight percent, which comprises:
1. separating said feedstock into a vacuum gas oil fraction and a vacuum residuum fraction;
2. contacting at least a portion of said vacuum gas oil fraction with a first hydrodesulfurization catalyst and hydrogen gas in a first hydrodesulfurization zone under a hydrogen partial pressure in the range 300 to 800 psig, said catalyst consisting essentially of a sulfided composite of alumina, molybdenum, phosphorus and a metal selected from the group consisting of cobalt and nickel, said catalyst having a pore volume in the range from 0.3 to 1 cc per gram, the pores in said catalyst having a diameter in the range 0 to about 3000 Angstroms and an average pore diameter in the range 80 to 150 Angstroms, the 80 to 150-Angstrom diameter pores of said catalyst contributing at least 70 volume percent of said pore volume 3. withdrawing from said first hydrodesulfurization zone said low-sulfur hydrocarbon mixture, the 350° F.+ portion thereof having a sulfur content below 0.2 weight percent, calculated as elemental sulfur.

15. A process as in claim 14 wherein less than about 5 volume percent of said pore volume is contributed by minimicropores.

16. A process as in claim 15 wherein said Group VIII metal is nickel.

17. A process as in claim 15 wherein said Group VIII metal is cobalt and the said composite has an atomic ratio of cobalt to molybdenum in the range 0.3 to 0.6.

18. A process as in claim 14 wherein:
 1. at least a portion of said vacuum residuum fraction is contacted with a select second hydrodesulfurization catalyst and hydrogen in a second hydrodesulfurization zone under vacuum residuum hydrodesulfurization conditions, said catalyst comprising a sulfided composite of alumina, molybdenum, phosphorus and a metal selected from the group consisting of cobalt and nickel, said catalyst having a pore volume in the range from 0.3 to 1 cc per gram, the pores of said catalyst having a diameter in the range 0 to about 3000 Angstroms and an average pore diameter in the range 80 to 150 Angstroms, the 80 to 150 Angstrom diameter pores of said catalyst contributing at least 70 percent of said pore volume, with the further requirement that of said pore volume, the macropore content thereof being in the range from about 0.2 to 3 percent of said pore volume, said vacuum residuum hydrodesulfurization conditions comprising a temperature in the range 600° to 850° F., a pressure in the range 1000 to 2500 psig, a liquid hourly space velocity in the range below about 1 and the use of a hydrogen-containing gas having a hydrogen content of at least about 75 volume percent;
 2. a sulfur-reduced vacuum residuum is withdrawn from said second zone and passed to a vacuum fractionator;
 3. a 350° F.–1050° F. boiling range hydrocarbon mixture having a sulfur content below about 0.15 weight percent is withdrawn from said fractionator; and
 4. a fuel oil blend is produced by mixing at least a portion of said 350° F.–1050° F. hydrocarbon mixture with at least a portion of said 350° F.+ portion, said blend having a sulfur content below about 0.2 weight percent.

19. A process as in claim 10 wherein said first catalyst consists essentially of cobalt or nickel, molybdenum, phosphorus and of alumina and wherein said second catalyst consists essentially of cobalt or nickel, molybdenum and of alumina.

20. A process for producing a low-sulfur hydrocarbon mixture by desulfurizing a hydrocarbon feedstock, said feedstock being a reduced-crude obtained from a whole crude having a sulfur content of at least about 1 weight percent, which comprises:
 1. separating said feedstock into a vacuum gas oil (VGO) and a vacuum residuum fraction, said residuum fraction containing asphalt;
 2. producing an asphalt-reduced fraction by separating in an asphalt removal unit at least a portion of said vacuum residuum fraction into an asphalt fraction and an asphalt-reduced residuum;
 3. producing a hydrocarbon composite by combining said asphalt-reduced residuum from step (2); with at least a portion of said vacuum gas oil;
 4. producing said low-sulfur hydrocarbon mixture by contacting said hydrocarbon composite from step (3) with a hydrodesulfurization catalyst and hydrogen gas in a hydrodesulfurization zone under a hydrogen partial pressure in the range 300 to 800 psig and at a temperature in the range 550 to 850° F., said catalyst consisting essentially of a sulfided composite of alumina, molybdenum, phosphorus and a metal selected from the group consisting of cobalt and nickel, said catalyst having a pore volume in the range from 0.3 to 1 cc per gram, the pores in said catalyst having a diameter in the range 0 to 3000 A. and an average pore diameter in the range 80 to 150 A., the 80 to 150 A. diameter pores contributing at least 70 percent of said pore volume.

21. A process as in claim 1 wherein at least a portion of said low-sulfur hydrocarbon mixture is used as a feed to an FCC or hydrocracker unit.

22. A process as in claim 1 wherein said low-sulfur hydrocarbon mixture is separated by fractional distillation into:
 1. a butane fraction;
 2. a $C_5$-350° F. fraction, said fraction having a sulfur content less than 0.01 weight percent; and
 3. a 350°–1050° F. fraction, said fraction having a sulfur content less than 0.1 weight percent.

23. A process as in claim 22 wherein said 350°–1050° F. fraction is separated into a 350°–650° F. fraction and a 650°–1050° F. fraction.

24. A process as in claim 1 wherein said catalyst base is at least 95 weight percent alumina.

25. A process as in claim 1 wherein said catalyst base is at least 95 weight percent alumina, said catalyst having been prepared by the steps comprising:
 1. calcining said alumina base component at a temperature in the range 1400° F. to 1700° F., there having been no previous calcination experience above about 1700° F.;
 2. impregnating said calcined alumina with an aqueous solution of a cobalt salt and a heteropolyphosphomolybdic acid; and
 3. sulfiding the calcined and impregnated alumina.

26. A process as in claim 14 wherein said composite has an atomic ratio of cobalt to molybdenum in the range 0.3 to 0.6.

* * * * *

UNITED STATES PATENT OFFICE
CERTIFICATE OF CORRECTION

Patent No. 4,006,076     Dated February 1, 1977

Inventor(s)     Robert I. Christensen et al.    Page 1 of 2

It is certified that error appears in the above-identified patent and that said Letters Patent are hereby corrected as shown below:

Abstract, Title Page, line 7, "2. a temperature 550° the range 550°F. to 850°F. should read --2. a temperature in the range 550°F. to 850°F.--.

Col. 6, lines 40-41, "as directed above" should read --as described above--.

Col. 10, line 29, "asphalatene" should read --asphaltene--.

Col. 13, line 22, "hydrometallization" should read -- hydroemetalization --.

Col. 13, lines 47-48, "70 volume percent" should read --70 percent--.

Col. 14, line 24, "hydrosulfurization" should read --hydrodesulfurization--.

Col. 15, line 22, "of said pore and" should read --of said pore volume and--.

Col. 15, line 58, "sulfide" should read --sulfided--.

UNITED STATES PATENT OFFICE
CERTIFICATE OF CORRECTION

Patent No. 4,006,076      Dated February 1, 1977

Inventor(s) Robert I. Christensen et al.      Page 2 of 2

It is certified that error appears in the above-identified patent and that said Letters Patent are hereby corrected as shown below:

Col. 15, line 59, "catalyst comprising" should read --catalyst base comprising--.

Col. 17, line 16, "a select second hydrodesulfurization" should read --a second hydrodesulfurization--.

Col. 18, line 25, "0 to 3000 A." should read --0 to about 3000 A.--.

Signed and Sealed this

Seventh Day of June 1977

[SEAL]

Attest:

RUTH C. MASON
Attesting Officer

C. MARSHALL DANN
Commissioner of Patents and Trademarks